United States Patent
Kitamura et al.

(10) Patent No.: US 8,653,743 B2
(45) Date of Patent: Feb. 18, 2014

(54) SWITCHING POWER SUPPLY DEVICE AND LIGHTING APPARATUS

(75) Inventors: Noriyuki Kitamura, Kanagawa-ken (JP); Yuji Takahashi, Kanagawa-ken (JP)

(73) Assignee: Toshiba Lighting & Technology Corporation, Kanagawa-Ken (JP)

( * ) Notice: Subject to any disclaimer, the term of this patent is extended or adjusted under 35 U.S.C. 154(b) by 143 days.

(21) Appl. No.: 13/424,115

(22) Filed: Mar. 19, 2012

(65) Prior Publication Data

US 2012/0249007 A1    Oct. 4, 2012

(30) Foreign Application Priority Data

Mar. 28, 2011   (JP) .................. 2011-071105

(51) Int. Cl.
- *H05B 37/02* (2006.01)
- *H02M 3/155* (2006.01)
- *H01L 33/00* (2010.01)

(52) U.S. Cl.
USPC .......................................... 315/224; 315/307

(58) Field of Classification Search
USPC ................ 315/224, 297, 307, 313; 363/21.12
See application file for complete search history.

(56) References Cited

U.S. PATENT DOCUMENTS

| | | | |
|---|---|---|---|
| 8,144,487 B2 * | 3/2012 | Djenguerian et al. | 363/21.12 |
| 2008/0122418 A1 | 5/2008 | Briere et al. | |
| 2008/0258695 A1 | 10/2008 | Kumar et al. | |
| 2012/0133340 A1 * | 5/2012 | Masumoto et al. | 320/164 |
| 2012/0147621 A1 * | 6/2012 | Holten et al. | 362/551 |

FOREIGN PATENT DOCUMENTS

| | | |
|---|---|---|
| JP | 2007-006658 | 1/2007 |
| JP | 4123886 | 5/2008 |

OTHER PUBLICATIONS

European Search Report for European Patent Application 12160359.1 dated Jul. 5, 2012, 6 pages.

* cited by examiner

*Primary Examiner* — Daniel D Chang
(74) *Attorney, Agent, or Firm* — Patterson & Sheridan, LLP (57) ABSTRACT

According to one embodiment, a switching power supply device includes a direct-current power supply and a switching operation conversion circuit. The switching operation conversion circuit is connected to the direct-current power supply, and includes an inductor, a switching element, a diode, a gate drive circuit, an input end and an output end. The switching element allows an increasing current to flow to the inductor from the direct-current power supply at an on time of the switching element. The diode allows a decreasing current to flow to the inductor at an off time of the switching element. The gate drive circuit controls a gate voltage of the switching element to turns off the switching element when the increasing current reaches a saturated state relative to a source-drain voltage of the switching element. The input end is connected to the direct-current power supply. The output end is connected with a load.

21 Claims, 7 Drawing Sheets

SWITCHING POWER SUPPLY DEVICE AND LIGHTING APPARATUS

CROSS-REFERENCE TO RELATED APPLICATIONS

This application is based upon and claims the benefit of priority from Japanese Patent Application No. 2011-071105, filed on Mar. 28, 2011; the entire contents of which are incorporated herein by reference.

FIELD

Embodiments described herein relate generally to a switching power supply device and a lighting apparatus using the same.

BACKGROUND

A switching power supply is a power supply device using a switching element to convert and regulate electrical power in a power conversion device for obtaining a desired output power from an input power. The switching power supply includes a power supply device including a DC-DC converter that converts a direct-current power to another direct-current power, and a direct-current power supply that includes a rectifying device to convert an alternating-current power to a direct-current power and supplies the direct-current input power to the DC-DC converter.

As a use of the switching power supply, it is already known that an LED lighting device having high circuit efficiency is obtained by turning on a light-emitting diode. For example, a DC-DC converter includes a step-down chopper, and an increasing current flows through an inductor via a switching element in an on state, so that a voltage is induced in a secondary winding magnetically coupled thereto. The voltage is fed back and the on operation of the switching element is continued. Besides, a resistance element for detecting the increasing current is inserted in series to the switching element, and a control circuit is added to turn off the switching element when the drop voltage of the resistance element exceeds a previously set threshold.

In the above structure, when the increasing current exceeds the threshold and the switching element is turned off, electromagnetic energy stored in the inductor is released, and a decreasing current flows via a diode and an output capacitor of an output end. When the decreasing current becomes 0, the switching element is turned on by counter electromotive force generated in the secondary winding of the inductor. The DC-DC conversion by self-excitation constant-current control is performed by repeating the circuit operation, and the light-emitting diode is turned on.

On the other hand, a semiconductor element using a wide band gap semiconductor or a compound semiconductor, such as III-V group semiconductor and IV semiconductor, having a large band gap, for example, silicon carbide (SiC), gallium nitride (GaN) or diamond attracts attention as a semiconductor element having the potential to greatly break through the performance limit of a Si power device. That is, in high speed switching, high temperature operation, large power operation and the like, the semiconductor element can operate in a region where a Si or GaAs element cannot operate. Thus, also in the field of a high frequency power device, the expectation for the semiconductor is high. Here, the wide band gap semiconductor is a semiconductor having a band gap wider than gallium arsenide (GaAs) having a band gap of about 1.4 eV. The wide band gap semiconductor is, for example, a semiconductor having a band gap of 1.5 eV or more, gallium phosphide (GaP, band gap: about 2.3 eV), gallium nitride (GaN, band gap: about 3.4 eV), diamond (C, band gap: about 5.27 eV), aluminum nitride (AlN, band gap: about 5.9 eV), silicon carbide (SiC) or the like.

A wide band gap semiconductor transistor is an element which can be used as a switching element, and more specifically, is a transistor fabricated using a wide band gap semiconductor. For example, the wide band gap semiconductor transistor is a field effect high-frequency transistor including a pair of main terminals (drain, source) and a control terminal (gate). The transistor is typically a high electron mobility transistor (HEMT). Since the semiconductor transistor has the excellent characteristics as described above, when the wide band gap semiconductor transistor is used as a switching element of a switching power supply, a high frequency operation of 10 MHz or higher can be performed. As a result, the switching power supply, especially an inductor can be greatly miniaturized.

Incidentally, as the wide band gap semiconductor transistor, a JFET (junction FET), a SIT (Static Induction Transistor), a MESFET (metal-semiconductor FET: Metal-Semiconductor-Field-Effect-Transistor), a HFET (Heterojunction Field Effect Transistor), a HEMT (High Electron Mobility Transistor) and a storage FET are enumerated.

Besides, the wide band gap semiconductor transistor often has a normally-on characteristic in which a drain current flows when a gate voltage is 0. Accordingly, in order to certainly turn off the semiconductor element having the normally-on characteristic (hereinafter referred to as a normally-on switch), a drive circuit for negative gate voltage is required. Incidentally, a wide band gap semiconductor transistor having a normally-off characteristic is also obtained. In this case, a drive circuit for positive voltage is required.

When constant-current control is performed, a related art switching power supply requires a current feedback type feedback circuit including an impedance unit, such as a resistance element, that is inserted in series to a switching element and detects an increasing current flowing through an inductor, and a control circuit that turns off the switching element when the voltage drop of the impedance unit reaches a previously set threshold. Thus, the circuit structure becomes complicated, and miniaturization is difficult.

When the wide band gap semiconductor transistor is used as a switching element of a switching power supply, since the switching element can be operated at a high frequency of 10 MHz or higher as stated above, the whole apparatus can be remarkably miniaturized. In this case, when a constant current element including a wide band gap semiconductor transistor is connected in series to the source of the wide band gap semiconductor transistor, an impedance unit such as a resistance element for current detection can be omitted, and a structure of a gate drive circuit is simplified, and therefore, further miniaturization can be realized.

Although the switching power supply using the wide band gap semiconductor transistor can be further miniaturized by using the two wide band gap semiconductor transistors for switching and for constant current control as stated above, there is a limit in meeting a request for further cost reduction and miniaturization.

An exemplary embodiment provides a switching power supply device in which cost reduction and miniaturization are realized by using one switching element for switching and for constant current control, and a lighting apparatus using the same.

DETAILED DESCRIPTION

In general, according to one embodiment, a switching power supply device includes a direct-current power supply and a switching operation conversion circuit. The switching operation conversion circuit is connected to the direct-current power supply and includes an inductor, a switching element, a diode, a gate drive circuit, an input end and an output end. The switching element allows an increasing current to flow to the inductor from the direct-current power supply at an on time of the switching element. The diode allows a decreasing current to flow to the inductor at an off time of the switching element. The gate drive circuit controls a gate voltage of the switching element to turns off the switching element when the increasing current reaches a saturated state relative to a source-drain voltage of the switching element. The input end is connected to the direct-current power supply. The output end is connected with a load.

According to another embodiment, a lighting apparatus includes a switching power supply device and an illumination load connected to an output end of the switching power supply device. The switching power supply device includes a direct-current power supply and a switching operation conversion circuit. The switching operation conversion circuit is connected to the direct-current power supply and includes an inductor, a switching element, a diode, a gate drive circuit, an input end and an output end. The switching element allows an increasing current to flow to the inductor from the direct-current power supply at an on time of the switching element. The diode allows a decreasing current to flow to the inductor at an off time of the switching element. The gate drive circuit controls a gate voltage of the switching element to turns off the switching element when the increasing current reaches a saturated state relative to a source-drain voltage of the switching element. The input end is connected to the direct-current power supply. The output end is connected with the illumination load.

First Embodiment

Figure 1:
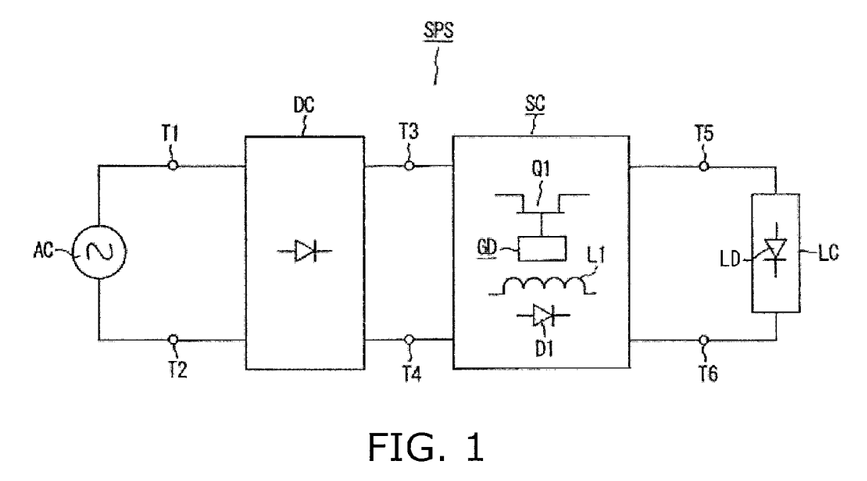
FIG. 1 is a block diagram of a switching power supply device of a first embodiment.

FIG. 1 is a block diagram of a switching power supply device of a first embodiment.

In the first embodiment, a switching power supply device SPS includes a direct-current power supply DC and a switching operation conversion circuit SC, and the output thereof is supplied as direct-current power to a load LC.

The direct-current power supply DC is a unit to input a direct-current power before conversion to the switching operation conversion circuit SC described later. Although any structure may be used as long as the direct-current power before conversion is outputted, for example, the direct-current power supply is mainly composed of a rectifying circuit, and a smoothing circuit including a smoothing capacitor or the like may be added if desired. In this embodiment, the rectifying circuit is preferably constituted by a bridge type rectifying circuit. Besides, input terminals T1 and T2 of the direct-current power supply DC are connected to an alternating-current power supply AC, for example, a commercial alternating-current power supply, and a direct-current voltage is obtained by full-wave rectifying the alternating-current voltage. However, if desired, the direct-current power supply DC may be constructed such that an active filter such as a step-up chopper is added to the output side of the rectifying circuit.

The switching operation conversion circuit SC can also be called a DC-DC converter, and includes a switching element Q1, an inductor L1, a diode D1, a gate drive circuit GD, input ends T3 and T4, and output ends T5 and T6. The switching operation conversion circuit may be mainly composed of a chopper and a flyback converter. Incidentally, the chopper is the concept including various choppers such as a step-down chopper, a step-up chopper and a step-up/down chopper.

A first circuit A is a current path including the switching element Q1 and the inductor L1 connected in series. The switching element Q1 is driven by the after-mentioned gate drive circuit GD and performs a switching operation. The structure is such that at the on time, an increasing current flows from the direct-current power supply DC through the transistor Q1 to the inductor L1. By this, electromagnetic energy is stored in the inductor L1.

The switching element Q1 is, for example, a wide band gap semiconductor transistor, for example, a gallium nitride high electron mobility transistor (GaN-HEMT). In this embodiment, the switching element Q1 performs the switching operation. The switching element Q1 is used, so that the switching characteristic in high frequency of 1 MHz or higher, for example, 10 MHz or higher is remarkably improved as described before, and switching loss is reduced, and further, the inductor L1 is remarkably miniaturized. Accordingly, the switching power supply device can be greatly miniaturized.

Besides, the switching element Q1 may have a normally-on characteristic or a normally-off characteristic. In general, the switching element having the normally-on characteristic is more easily obtained and the cost is low. However, the switching element having the normally-off characteristic can also be obtained and may be used. Besides, since the threshold of switching of the normally-on switch is negative, if the normally-on switch is used, off control using a drive winding L2 magnetically coupled to the inductor L1, that is, a secondary winding becomes easy, and the normally-on switch is preferable.

Figure 2:
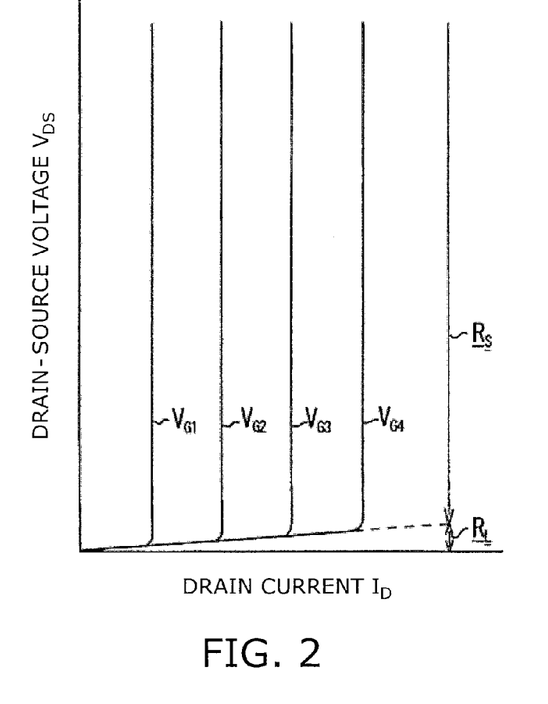
FIG. 2 is a graph showing a current-voltage characteristic of a switching element.

Further, if the switching element Q1 is, for example, the wide band gap semiconductor transistor, as shown in FIG. 2, the current-voltage characteristic thereof has a saturation region $R_S$ continuous from a non-saturation region $R_L$ through pinch-off, and it is known that an excellent constant current characteristic is exhibited in the saturation region $R_S$. Incidentally, in FIG. 2, the horizontal axis indicates drain current $I_D$, and the vertical axis indicates drain-source voltage $V_{DS}$. The drawing shows plural characteristic curves changing according to gate voltage $V_G$, that is, gate-source voltage as a parameter. In the present specification, the non-saturation region $R_L$ is a region in which the current-voltage characteristic becomes substantially linear. The saturation region $R_S$ is a region in which the current-voltage characteristic deviates from the straight line in the non-saturation region $R_L$, and an increase in drain-source voltage with respect to an increase in drain current is larger than the increase indicated by the inclination of the straight line in the non-saturation region $R_L$.

That is, the saturation region $R_S$ is the region including a region in which the switching element Q1 exhibits the constant current characteristic and a portion of a transition region between the non-saturation region $R_L$ and a region exhibiting the constant current characteristic.

As is understood from FIG. 2, if the switching element Q1 has the same chip area as a Si transistor, the increase in voltage with respect to the increase in current is very small in the non-saturation region $R_L$. This indicates that in this region $R_L$, the switching element Q1 is in an on state where the on resistance is very low. In the saturation region $R_S$, even if the voltage is raised, the current remains constant and is saturated. Besides, a saturation current value as a current value at saturation time changes according to the magnitude of the gate voltage. Accordingly, the saturation current value can be selected to a desired value by controlling the gate voltage $V_{GS}$. Incidentally, in order to facilitate understanding of the above, FIG. 2 shows the current-voltage characteristic curves at plural gate voltages $V_{G1}$ to $V_{G4}$ different in voltage value.

In this embodiment, when the increasing current reaches a threshold, the switching element Q1 is turned off by the control of the gate drive circuit GD. At that time, the gate voltage in which the threshold is selected to be located in the saturation region of the current-voltage characteristic is applied to the transistor Q1. As a result, when the increasing current flowing during the on period of the switching element Q1 reaches the threshold (first threshold), the current flowing through the switching element Q1 is abruptly saturated. Then, when the saturation current is abruptly changed from the increasing state to the constant threshold, the after-mentioned gate drive circuit GD applies the gate voltage selected to turn off the switching element Q1 and turns off the switching element Q1.

A second circuit B is a current path including the inductor L1 and the diode D1 connected in series. When the switching element Q1 is turned off by the switching operation, the inductor L1 discharges the electromagnetic energy stored therein. Thus, a decreasing current flows in the second circuit B through the diode D1. When the decreasing current reduces a threshold (second threshold), the after-mentioned drive circuit GD again turns on the switching element Q1. Incidentally, a synchronous rectifier using a field effect transistor FET or the like as a diode may be used.

The gate drive circuit GD is a circuit unit to control at least turning-off of the switching element Q1 when the on current reaches the first threshold. Besides, also when the switching element is turned on, the gate drive circuit GD can be made to function if desired. In this case, the switching element Q1 is normally-on, and also when the gate drive circuit GD removes application of the gate voltage in order to turn off the switching element, the gate drive circuit GD can be said to function.

The off operation by the gate drive circuit GD in switching of the switching element Q1 may be self-excited control or separately-excited control.

In the case of the self excitation, the structure can be made such that electric change caused by the circuit operation of the first and the second circuit A and B, such as the change of the drain-source voltage $V_{DS}$ of the switching element Q1 or the change of the terminal voltage $V_{L1}$ of the inductor L1, is detected and is fed back to turn off. By this, both the off timing and the gate voltage by which the current-voltage characteristic is saturated at the first threshold of current, in other words, the switching element Q1 exhibits the constant current characteristic can be obtained.

In the case of the separate excitation, an oscillator for switching is provided in the switching operation conversion circuit SC, and the timing of on and off of the switching element Q1 is set. The application of a required gate voltage can be controlled so that when the increasing current reaches the first threshold in the on period, the switching element is positioned in the saturation region and is turned off, and is again turned on at the timing when the decreasing current reaches the second threshold.

The input ends T3 and T4 are a unit constituting the input part of the switching operation conversion circuit SC, and are connected to the output ends of the direct-current power supply DC. The input ends T3 and T4 may have a form of a connection unit such as a terminal, or may be simply a conductive wire connecting the direct-current power supply DC and the input part of the switching operation conversion circuit SC.

The output ends T5 and T6 are a unit constituting the output part of the switching operation conversion circuit SC, and the load LC is connected thereto. The output ends T5 and T6 may adopt a free form similarly to the input ends T3 and T4.

The load LC is driven and operated by the output of the switching power supply device SPS. In this embodiment, the load LC may have any structure, and in the illustrated example, the load is made of an LED LD. Accordingly, the lighting apparatus can be constructed which includes a light source such as a lamp, that is, an illumination load, and the switching power supply device SPS of the embodiment as a part of or substantially the whole of a lighting circuit to directly or indirectly drive the illumination load.

In the switching operation conversion circuit SC, as another structure, an output capacitor can be connected between the output ends T5 and T6. The output capacitor causes a high frequency component, which is generated by switching of the switching element Q1 in the switching operation conversion circuit SC, to bypath, and can suppress the high frequency component from flowing out to the load LC side.

In the first embodiment, in the switching operation conversion circuit SC, the inductor L1 repeats the storage and release of the electromagnetic energy by the switching of the switching element Q1, and as a result, the direct-current power inputted from the input ends T3 and T4 is converted to a desired power and is supplied from the output ends T5 and T6 to the load LC. Besides, when the increasing current reaches the first threshold, since the switching element Q1 transitions to the saturation region and the constant current flows, the switching element Q1 is turned off by indirectly or directly using the change of the circuit operation at that time. Accordingly, a constant current unit such as a constant current diode is not required to be connected in series to the switching element Q1, and the circuit structure can be simplified.

Figures 3A, 3B:
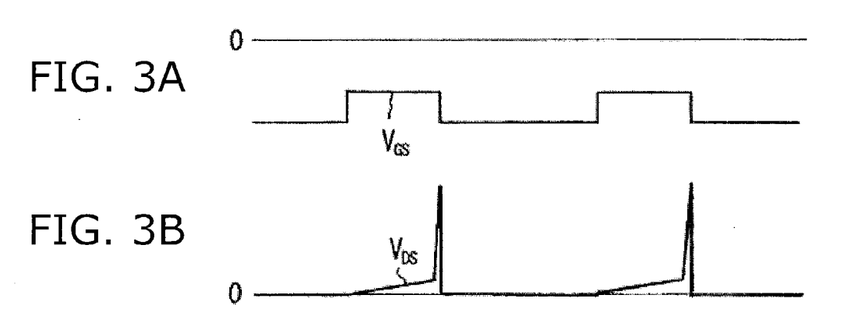
FIG. 3A to FIG. 3F are current-voltage waveform views of respective parts.
Figure 3C:
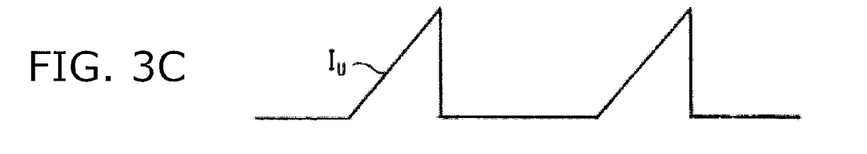
Figure 3D:
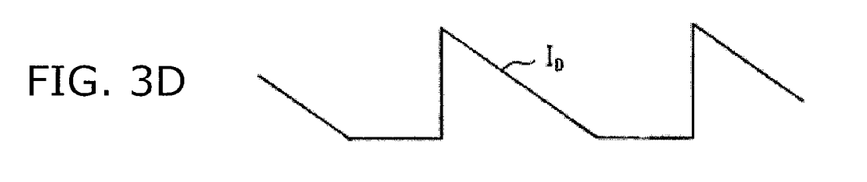
Figure 3E:
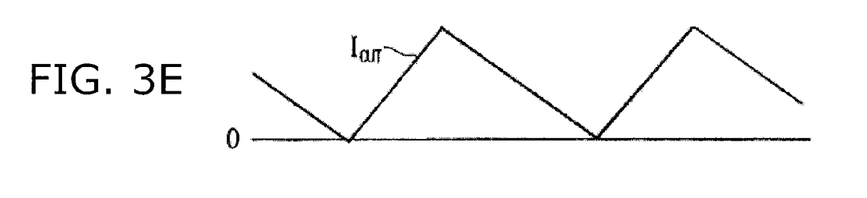
Figure 3F:
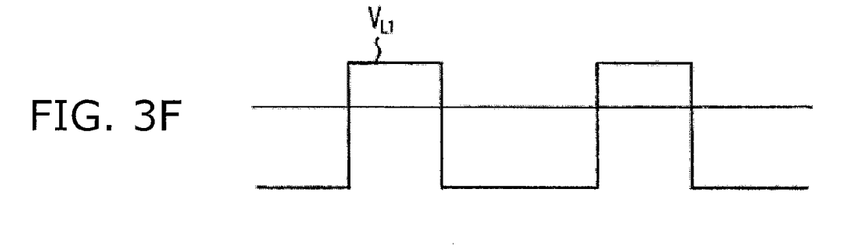

Next, the circuit operation in the first embodiment will be described in brief with reference to current-voltage waveform views of respective parts shown in FIGS. 3A to 3F. FIG. 3A shows a gate voltage waveform of the switching element of the first circuit A, FIG. 3B shows a waveform of the drain-source voltage $V_{DS}$ of the switching element Q1, FIG. 3C shows a waveform of an increasing current $I_U$, FIG. 3D shows a waveform of a decreasing current $I_D$, FIG. 3E shows an addition waveform of the increasing current and the decreasing current, and FIG. 3F shows a waveform of the voltage $V_{L1}$ of the inductor L1.

The gate voltage $V_{GS}$ of the normally-on switching element Q1 is, for example, −8 V in a low negative voltage period and −5 V in a high negative voltage period. Thus, the switching element Q1 is brought into an off state in the low negative voltage period. Besides, although the switching element is brought into the on state in the high negative voltage period, when the increasing current $I_U$ reaches about 220 mA, the switching element exhibits the saturation characteristic. That is, the first threshold can be selected to 220 mA. Accordingly, when the gate voltage $V_{GS}$ of FIG. 3A is made −5 V, the switching element Q1 is turned on, and the linearly increasing current $I_U$ flows through the inductor L1. When the increasing current reaches 220 mA of the first threshold, the switching element Q1 is saturated, and the drain-source voltage $V_{DS}$ increases as shown in FIG. 3B similarly to the case where the transistor is brought into the off state. In synchronization with that time, the gate voltage $V_{GS}$ outputted by the gate drive circuit GD is changed to −8 V as shown in FIG. 3A, so that the switching element Q1 is turned off. When the off period occurs, as shown in FIG. 3D, the decreasing current flows from the inductor L1. When the gate voltage $V_{GS}$ is changed to −5 V as shown in FIG. 3A when the decreasing current reaches the second threshold, for example, 0 mA as shown in FIG. 3D, the switching element Q1 is again turned on. After that, the above operation is repeated. As a result, as shown in FIG. 3E, the increasing current $I_U$ and the decreasing current $I_D$ continuously flow through the inductor L1. During the period, the polarity of the voltage at both ends of the inductor L1 is alternately inverted as shown in FIG. 3F.

Second Embodiment

Figure 4:
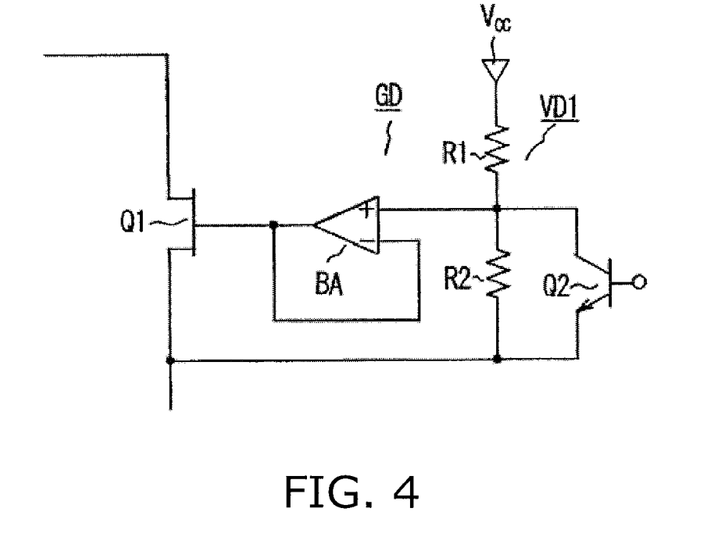
FIG. 4 is a main part circuit view of a second embodiment.

A second embodiment will be described with reference to FIG. 4. This embodiment is an example of a gate drive circuit GD of a normally-off switching element Q1. In this embodiment, the gate drive circuit GD is mainly composed of a switch element Q2, a voltage dividing circuit VD1 and a buffer amplifier BA.

That is, the switch element Q2 is made of, for example, a bipolar transistor, and is turned on and off so that the output voltage of the voltage dividing circuit VD1 is changed to a high voltage or a low voltage. The base of the switch element Q2 is connected to a switching period signal source (not shown). Incidentally, the switching period signal source is a signal source to determine the timing of on and off of the switching element Q1. The voltage dividing circuit VD1 is composed of a series circuit of resistors R1 and R2. In the drawing, the upper end is connected to a plus control power supply Vcc, and the lower end is connected to the source of the switching element Q1. The collector and emitter of the switch element Q2 are connected in parallel to the resistor R2. The buffer amplifier BA intervenes between the output end of the voltage dividing circuit VD1 and the gate of the switching element Q1, and the output is applied to the gate.

The circuit operation of this embodiment will be described. When the switching period signal source connected to the base of the switch element Q2 is periodically turned on and off, the gate drive circuit GD switches on and off the switching element Q1 in reverse phase relation to the switching period signal source. That is, when the switch element Q2 is turned off, the short circuit of the resistor R2 of the voltage dividing circuit VD1 is released and the terminal voltage of the resistor R2 becomes high. Thus, the gate voltage $V_{GS}$ applied between the gate and source of the switching element Q1 becomes high and the switching element is turned on. Next, when the switch element Q2 is turned on, the resistor R2 is shorted, and the output of the voltage dividing circuit VD1 becomes 0. Thus, the switching element Q1 is turned off.

Accordingly, the switching element Q1 can be switched according to the switching of the switch element Q2. However, as is understood from the above, with respect to the gate voltage when the switching element Q1 is turned on, the value at the timing when the switching element Q1 is turned off and at which the increasing current transitions into the saturation region Rs is selected to the first threshold. Incidentally, with respect to the switching period signal source to control the timing of the switching of the switch element Q2, as stated above, the switching operation conversion circuit SC may be self-excited and operated by using the feedback signal obtained from the switching operation conversion circuit SC, or may be separately excited and operated by using a separately provided oscillator.

Third Embodiment

Figure 5:
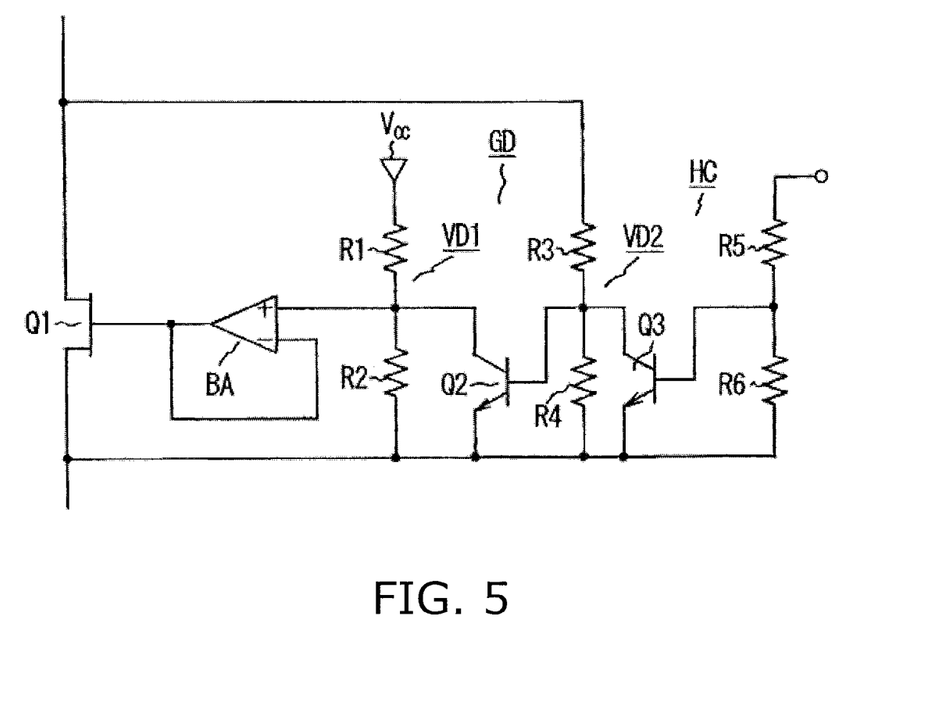
FIG. 5 is a main part circuit view of a third embodiment.

A third embodiment will be described with reference to FIG. 5. Incidentally, in the drawing, the same portion as FIG. 4 is denoted by the same reference numeral and the description thereof is omitted. This embodiment is an example in which a gate drive circuit GD includes a holding circuit HC. The holding circuit HC holds a switching element Q1 in an off state during a current flowing period of a decreasing current flowing through a switching operation conversion circuit SC, and releases the holding of the off state when the switching element Q1 is turned on.

In this embodiment, in comparison with the second embodiment, the holding circuit HC is mainly composed of a voltage dividing circuit VD2 and a switch element Q3, and constitutes a part of the gate drive circuit GD.

That is, the voltage dividing circuit VD2 of the holding circuit HC includes a series circuit of resistors R3 and R4, and in the drawing, the upper end is connected to the drain of the switching element Q1, and the lower end is connected to the source. Besides, the switch element Q3 is made of, for example, a bipolar transistor, the collector and the emitter are connected in parallel to the resistor R4 of the voltage dividing circuit VD2, and an on signal source (not shown) of the switching element Q1 is connected to the base. Incidentally, a resistor R5 is connected in series between the base of the switch element Q3 and the on signal source, and a resistor R6 is connected between the base and the emitter to regulate the base current. Incidentally, the on signal source is a signal source to determine the timing of on of the switching element Q1.

The circuit operation of this embodiment will be described. In the off state of the switching element Q1, since the drain-source voltage $V_{DS}$ is high, the voltage is applied to the base of the switch element Q2 through the voltage dividing circuit VD2 of the holding circuit HC, so that the base current flows through the switch element Q2, and the switch element Q2 is on. Since the gate voltage of the switching element Q1 becomes low by this, the switching element Q1 holds the off state.

In order to turn on the switching element Q1, the switch element Q2 is periodically shorted between the base and emitter by the switch element Q3. Then, the output of a voltage dividing circuit VD1 becomes high, the holding of the off state of the switching element Q1 by the holding circuit HC is released, and the switching element Q1 is turned on. In order to turn on the switch element Q3, the base potential is made high by the on signal source.

Accordingly, when the switching element Q1 is periodically turned on by the on signal source for a specified period, the switching operation conversion circuit SC can be operated. Of course, the operation condition is naturally set so that the increasing current reaches the first threshold at the end of the on time, and the drain current $I_D$ transitions into the saturation region.

Fourth Embodiment

Figure 6:
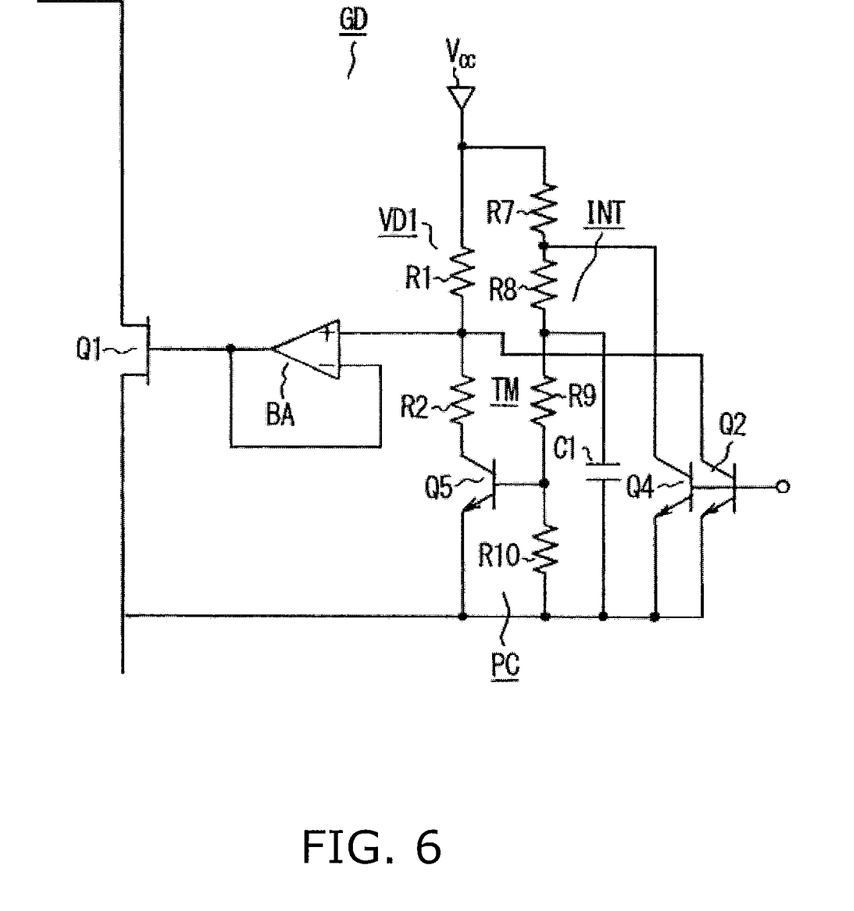
FIG. 6 is a main part circuit view of a fourth embodiment.

A fourth embodiment will be described with reference to FIG. 6. Incidentally, in the drawing, the same portion as FIG. 4 is denoted by the same reference numeral, and the description thereof is omitted. In this embodiment, a gate drive circuit GD includes a protecting circuit PC which operates at the initial on stage of the switching element Q1. The protecting circuit PC is a unit to perform protection by changing a gate voltage so that at the initial on stage of the switching element Q1, the on operation is not distributed by a transient pulse current which is easily generated by a snubber capacitor or the like equivalently connected to both ends of the switching element. In this embodiment, the protecting circuit PC includes a timer TM and a switch element Q4.

The timer TM includes a switch element Q5 and an integration circuit INT. The switch element Q5, for example, a bipolar transistor is connected between a resistor R2 of a voltage dividing circuit VD1 and the source of the switching element Q1. The integration circuit INT includes a series circuit of resistors R7 to R10 connected as shown in FIG. 6 and a capacitor C1. The series circuit of the resistors R7 to R10 is connected between a control power supply Vcc and the source of the switching element Q1, and the capacitor C1 is connected in parallel to a series portion of the resistors R9 and R10.

The switch element Q4 is connected between a connection point between the resistor R7 and the resistor R8 of the integration circuit INT and the source of the switching element Q1, and resets the timer by shorting the integration circuit INT except for the resistor R7. Besides, the base of the switch element Q4 is connected to the base of a switch element Q2. Accordingly, the switch elements Q2 and Q5 synchronously perform on and off operations according to a switching period signal from a switching period signal source.

The circuit operation of this embodiment will be described. At turning-on of the switching element Q1, when an off signal reaches from the switching period signal source, both the switch elements Q2 and Q4 are turned on. At this time, since the switch element Q2 shorts the resistor R2 of the voltage dividing circuit VD1 and the switch element Q5, the gate potential of the switching element Q1 becomes low, for example, 0 V and the switching element is turned on. Besides, at the same time, the switch element Q4 resets the timer TM.

Next, when an on signal reaches from the switching period signal source, both the switch elements Q2 and Q4 are turned off. The short circuit of the resistor R2 of the voltage dividing circuit VD1 and the switch element Q5 is released by turning-off of the switch element Q2, and the timer TM starts to operate by turning-off of the switch element Q4. However, since the integration operation of the integration circuit INT just starts, the switch element Q5 is off. Thus, since the gate potential of the switching element Q1 is increased to the voltage of the control power supply Vcc, the switching element Q1 is sufficiently conductive, and the non-saturation region $R_L$ is significantly expanded. As stated above, even if a transient pulse current, which is easily generated in the switching element Q1 at the initial on stage, flows, the switching element Q1 is not saturated. That is, the saturation current value becomes high at the initial on stage of the switching element Q1. Thus, since the on operation of the switching element Q1 is protected, an erroneous operation is hard to occur in the on operation at the initial on stage.

When the initial stage of the on period passes, since the base current flows and the switch element Q5 is turned on by the integration operation of the integration circuit INT, the gate potential of the switching element Q1 decreases to a middle level. In this state, although the transistor Q1 remains on, since the saturation current value decreases to the first threshold, when the on period reaches the end, the drain current $I_D$ reaches the first threshold. When the switch element Q2 is turned on by the off signal from the switching period signal source, the switching element Q1 is turned off. Since the switch element Q4 is tuned on at the same time as the switch element Q2, the integration circuit INT is reset, and the timer TM is reset for next turning-on of the switching element Q1.

Figure 7A:
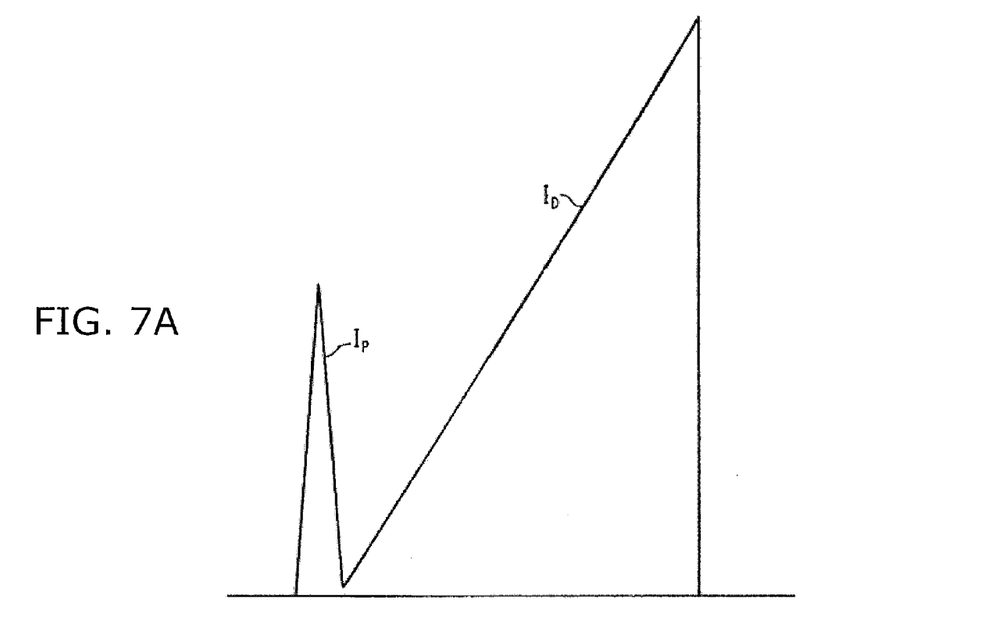
FIG. 7A to FIG. 7C are current-voltage waveform views of respective parts.
Figure 7B:
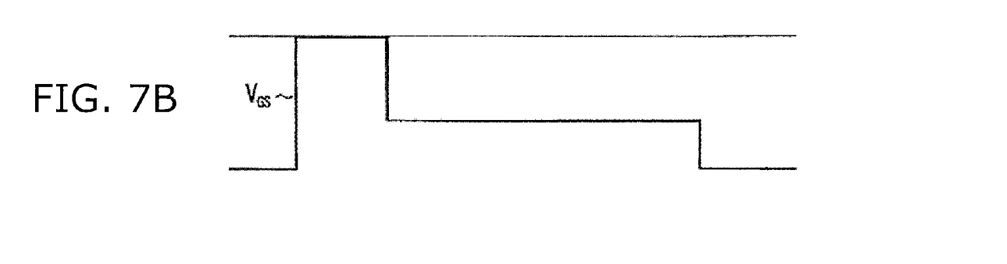
Figure 7C:
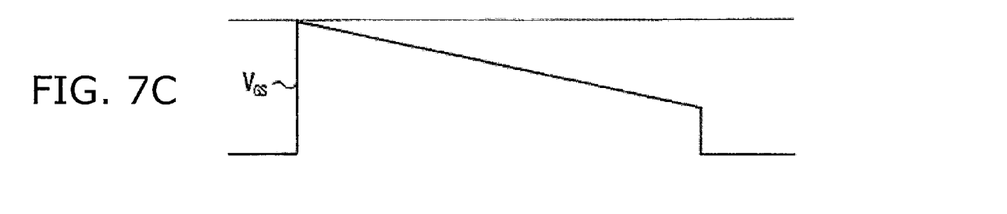

FIGS. 7A to 7C are waveform views of respective parts for explaining the circuit operation of the protecting circuit PC in the fourth embodiment. FIG. 7A shows a drain current waveform of the switching element Q1, FIG. 7B shows a gate voltage waveform, and FIG. 7C shows a gate voltage waveform in another modified example.

As shown in FIGS. 7A to 7C, at the initial stage of the switching element Q1, a pulse current $I_P$ can occur in the drain current $I_D$. For example, when the switching element Q1 is changed from off to on when the current of the inductor L1 has a finite value before the current becomes zero, the pulse current $I_P$ occurs at the initial on stage. However, since the gate voltage shown in FIG. 7B becomes sufficiently high at the initial on stage, the non-saturation region of the current-voltage characteristic of the switching element Q1 is expanded. Thus, even if the pulse current $I_P$ occurs, the current can be sufficiently made to flow in the non-saturation region. Thus, the on operation is protected and the turning-on can be certainly performed.

FIG. 7C shows the modified example of the gate voltage at the on time. In this example, although the gate voltage is maximum at the initial stage, thereafter, the gate voltage is continuously decreased, and is set so that the saturation current value of the current-voltage characteristic immediately before turning-off becomes the first threshold. Also in this example, the circuit operation similarly to the above can be performed.

Fifth Embodiment

Figure 8:
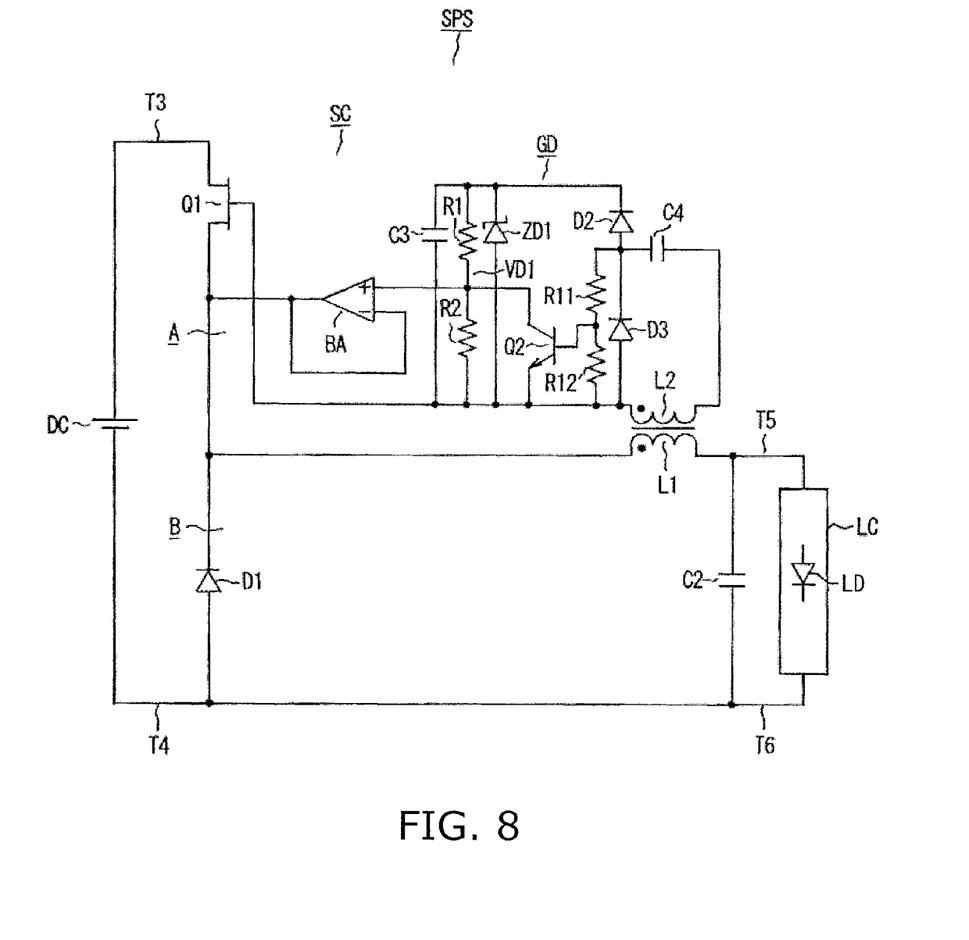
FIG. 8 is a circuit view of a switching power supply device of a fifth embodiment.

A fifth embodiment will be described with reference to FIG. 8. Incidentally, the same portion as FIG. 1 is denoted by the same reference numeral and the description thereof is omitted. In this embodiment, a switching operation conversion circuit SC of a switching power supply device SPS is composed of a step-down chopper.

That is, input ends T3 and T4 of the switching operation conversion circuit SC are connected to a direct-current power supply DC. A first circuit A includes a series circuit of a switching element Q1, an inductor L1 and an output capacitor C2, and both ends thereof are connected to the input ends T3 and T4. In s second circuit B, the inductor L1, the output capacitor C2 and a diode D1 are connected in series and form a closed circuit. Output ends T5 and T6 are connected to both ends of the output capacitor C2. Besides, the output ends T5 and T6 are connected with a load LC. Incidentally, the switching element Q1 is a normally-off element and is, for example, a GaN-HEMT.

A gate drive circuit GD is mainly composed of a voltage dividing circuit VD1, a buffer amplifier BA, a switch element Q2, a drive winding L2, diodes D2 and D3, a capacitor C3 and a Zener diode ZD1. The voltage dividing circuit VD1 is connected in parallel to the capacitor C3 and the Zener diode ZD1. The buffer amplifier BA is connected between a connection point between resistors R1 and R2 of the voltage dividing circuit VD1 and the gate of the switching element Q1 as shown in the drawing. The switch element Q2 is similar to the second embodiment in that the switch element is connected in parallel to the resistor R2 and can short the resistor R2. The drive winding L2 is magnetically coupled to the inductor L1 with the illustrated polarity, and is connected so that the induced voltage is applied to a series circuit of resistors R11 and R12 through a coupling capacitor C4, and is applied to the parallel circuit of the voltage dividing circuit VD1, the capacitor C3 and the Zener diode ZD1 through the diode D2. A connection point between the resistors R11 and R12 is connected to the base of the switch element Q2. Besides, the diode D3 is connected in parallel to the series circuit of the resistors R11 and R12 in the illustrated polarity, and bypasses the voltage induced in the drive winding L2 in the opposite polarity with respect to the diode D3.

Next, the circuit operation of the fifth embodiment will be described. When the direct-current power supply DC is applied between the input ends T3 and T4, first, a positive potential is supplied to the gate of the switching element Q1 through a not-shown starting circuit. The switching element Q1 is turned on with a sufficient conductivity, and an increasing current flows through the inductor L1 in the first circuit A.

In the first circuit A, when the increasing current flows through the inductor L1, a voltage with a polarity in the forward direction with respect to the diode D3 is induced in the drive winding L2 magnetically coupled thereto. Since the switch element Q2 is turned off by this, both a voltage applied to a non-inversion input terminal of the buffer amplifier BA and an output voltage become high plus voltages. As a result, the gate potential becomes higher than the source potential. As a result, a saturation current value of the current-voltage characteristic of the switching element Q1 becomes low.

Accordingly, when the increasing current reaches the saturation current value, the switching element Q1 is abruptly saturated and is brought into the constant current state, and the induced voltage of the drive winding L2 becomes 0. Then, the switch element Q2 is biased by the resistors R11 and R12 and is turned on. As a result, the voltage at both ends of the resistor R2 becomes zero, and the output voltage of the buffer amplifier BA becomes zero. The gate-source voltage of the switching element Q1 becomes substantially zero, and the switching element Q1 is turned off.

When the switching element Q1 is turned off, electromagnetic energy stored in the inductor L1 is released, and the decreasing current flows in the second circuit B. The switching element Q1 is held in the off state during a specified period in which the decreasing current flows and the switch element Q2 keeps the on state. When the decreasing current becomes 0, the switch element Q2 is turned off, and the gate voltage of the switching element Q1 becomes high. As a result, the switch element Q2 is again turned on, and thereafter, the foregoing circuit operation is repeated.

In the above circuit operation, since the increasing current and the decreasing current continuously flow through the output capacitor C2 and the capacitor is charged, the DC-DC converted direct-current power is outputted between the output ends T5 and T6, and the load LC connected thereto is driven and operated.

Sixth Embodiment

Figure 9:
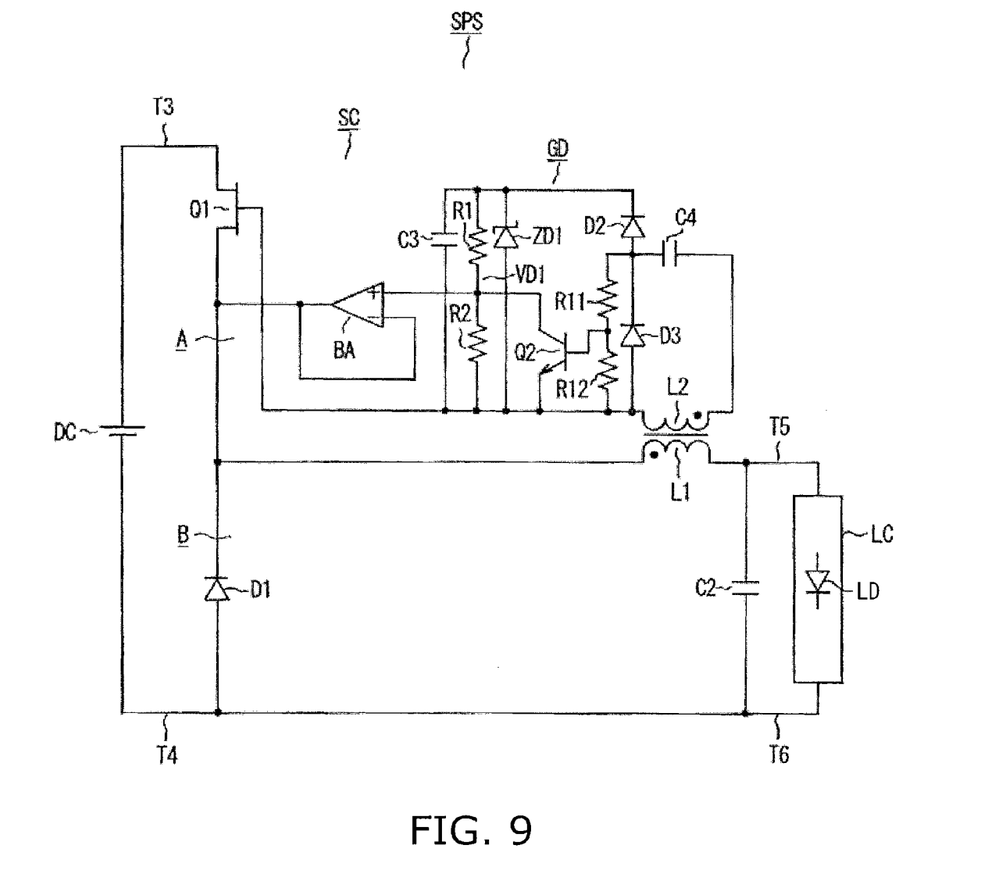
FIG. 9 is a circuit view of a switching power supply device of a sixth embodiment.

A sixth embodiment will be described with reference to FIG. 9. Incidentally, the same portion as FIG. 1 is denoted by the same reference numeral and the description thereof is omitted. In this embodiment, a switching operation conversion circuit SC of a switching power supply device SPS is composed of a step-down chopper.

That is, input ends T3 and T4 of the switching operation conversion circuit SC is connected to a direct-current power supply DC. A first circuit A includes a series circuit of a switching element Q1, an inductor L1 and an output capacitor C2, and both ends thereof are connected to input ends T3 and T4. In a second circuit B, the inductor L1, the output capacitor C2 and a diode D1 are connected in series and a closed circuit is formed. Output ends T5 and T6 are connected to both ends of the output capacitor C2. Besides, a load LC is connected to the output ends T5 and T6. Incidentally, the switching element Q1 is composed of a normally-on GaN-HEMT.

A gate drive circuit GD is mainly composed of a voltage dividing circuit VD1, a buffer amplifier BA, a switch element Q2, a drive winding L2, diodes D2 and D3, a capacitor C3 and a Zener diode ZD1. The voltage dividing circuit VD1 is connected in parallel to the capacitor C3 and the Zener diode ZD1. The buffer amplifier BA is connected between a connection point between resistors R1 and R2 of the voltage dividing circuit VD1 and the source of the switching element Q1 as shown in the drawing. The switch element Q2 is similar to the second embodiment in that the switch element is connected in parallel to the resistor R2, and can short the resistor R2. The drive winding L2 is magnetically coupled to the inductor L1 in the illustrated polarity, and is connected so that the induced voltage is applied to the series circuit of resistors R11 and R12 through a coupling capacitor C4, and is applied to a parallel circuit of the voltage dividing circuit VD1, the capacitor C3 and the Zener diode ZD1 through the diode D2. A connection point between the resistors R11 and R12 of the series circuit is connected to the base of the switch element Q2. The diode D3 is connected in parallel to the series circuit of the resistors R11 and R12 in the illustrated polarity, and bypasses the voltage induced in the drive winding L2 in the opposite polarity with respect to the diode D3.

As stated above, this embodiment is different from the fifth embodiment in the structure of the switching element Q1, the buffer amplifier BA and the drive winding L2.

Next, the circuit operation of the sixth embodiment will be described. When the direct-current power supply DC is applied between the input ends T3 and T4, since a potential is not applied to the gate of the switching element Q1 at first, the switching element is turned on with a sufficient conductivity, and an increasing current flows through the inductor L1 in the first circuit A. Incidentally, at the initial on stage, since the gate potential of the switching element Q1 is 0, the switching element is turned on with the sufficient conductivity, and accordingly, even if a pulse voltage is generated in the switching element Q1, the on operation is not disturbed.

In the first circuit A, when the increasing current flows through the inductor L1, a voltage with the opposite polarity with respect to the diode D3 is induced in the drive winding L2 magnetically coupled thereto. Since the switch element Q2 is turned on by this, both a voltage applied to the non-inversion input terminal of the buffer amplifier BA and an output voltage become low plus voltages. As a result, the gate potential becomes a relatively high negative potential, for example, −5 V. As a result, a saturation current value of current-voltage characteristic of the switching element Q1 becomes small, for example, 220 mA.

Accordingly, since the saturation current value becomes the first threshold at the time of turning off the switching element Q1, when the increasing current reaches 220 mA, the switching element Q1 is abruptly saturated and is brought into the constant current state, and the induced voltage of the drive winding L2 becomes 0. Then, the switch element Q2 is turned off since the forward bias thereof disappears. On the other hand, since the parallel circuit of the voltage dividing circuit VD1, the capacitor C3 and the Zener diode ZD1 is connected to the drive winding L2 through the diode D2. Thus, since the output voltage of the buffer amplifier BA becomes high, the source of the switching element Q1 becomes a high plus potential, while the gate potential becomes a relatively low negative potential, for example, −8 V, and the switching element Q1 is turned off.

When the switching element Q1 is turned off, since the capacitor C3 has a remaining charge, the output of the voltage dividing circuit VD1 continues, and accordingly, the switching element Q1 is held in the off state for a specified period. When the switching element Q1 is turned off, electromagnetic energy stored in the inductor L1 is released, and the decreasing current flows in the second circuit B. When the decreasing current becomes 0, since the gate voltage of the switching element Q1 disappears, the switching element is again turned on, and after that, the foregoing circuit operation is repeated.

In the above circuit operation, since the increasing current and the decreasing current continuously flow through the output capacitor C2, the DC-DC converted direct-current power is outputted between the output ends T5 and T6, and the load LC connected thereto is driven and operated.

Although the exemplary embodiments have been described, these embodiments have been presented by way of example only, and are not intended to limit the scope of the invention. Indeed, these novel embodiments can be carried out in a variety of other forms, and various omissions, substitutions and changes can be made within the scope not departing from the gist of the invention. These embodiments and modifications thereof fall within the scope and the gist of the invention and fall within the scope of the invention recited in the claims and their equivalents.

What is claimed is:

1. A switching power supply device comprising:
a direct-current power supply; and
a switching operation conversion circuit connected to the direct-current power supply, the switching operation conversion circuit including
an inductor,
a switching element that allows an increasing current to flow to the inductor from the direct-current power supply at an on time of the switching element,
a diode that allows a decreasing current to flow to the inductor at an off time of the switching element,
a gate drive circuit that controls a gate voltage of the switching element to turn off the switching element when the increasing current reaches a saturated state relative to a source-drain voltage of the switching element,
an input end connected to the direct-current power supply, and
an output end to which a load is connected.

2. The device of claim 1, wherein the gate drive circuit holds the switching element in an off state during a current flowing period of the decreasing current, and holding of the switching element in the off state is released to turn on the switching element.

3. The device of claim 1, wherein the gate drive circuit operates the switching element so that a pulse current generated during an initial on period of the switching element flows in a non-saturation region.

4. The device of claim 1, wherein the gate voltage of the switching element during an on period is varied.

5. The device of claim 4, wherein the gate drive circuit supplies a higher gate voltage immediately after turning-on than a gate voltage immediately before turning-off during the on period.

6. The device of claim 5, wherein the gate voltage during the on period stepwise changes.

7. The device of claim 5, wherein the gate voltage during the on period linearly changes.

8. The device of claim 1, wherein the gate drive circuit includes a drive winding magnetically coupled to the inductor.

9. The device of claim 1, wherein the switching element is a normally-on element.

10. The device of claim 1, wherein the switching element is a normally-off element.

11. A lighting apparatus comprising:
a switching power supply device; and
an illumination load connected to an output end of the switching power supply device, wherein
the switching power supply device includes
a direct-current power supply, and
a switching operation conversion circuit connected to the direct-current power supply, the switching operation conversion circuit including
an inductor,
a switching element that allows an increasing current to flow to the inductor from the direct-current power supply at an on time of the switching element,
a diode that allows a decreasing current to flow to the inductor at an off time of the switching element,
a gate drive circuit that controls a gate voltage of the switching element to turn off the switching element when the increasing current reaches a saturated state relative to a source-drain voltage of the switching element,
an input end connected to the direct-current power supply, and
an output end to which the illumination load is connected.

12. The apparatus of claim 11, wherein the gate drive circuit holds the switching element in an off state during a current flowing period of the decreasing current, and holding of the switching element in the off state is released to turn on the switching element.

13. The apparatus of claim 11, wherein the gate drive circuit operates the switching element so that a pulse current generated during an initial on period of the switching element flows in a non-saturation region.

14. The apparatus of claim 11, wherein the gate voltage of the switching element during an on period is varied.

15. The apparatus of claim 14, wherein the gate drive circuit supplies a higher gate voltage immediately after turning-on than a gate voltage immediately before turning-off during the on period.

16. The apparatus of claim 15, wherein the gate voltage during the on period stepwise changes.

17. The apparatus of claim 15, wherein the gate voltage during the on period linearly changes.

18. The apparatus of claim 11, wherein the gate drive circuit includes a drive winding magnetically coupled to the inductor.

19. The apparatus of claim 11, wherein the switching element is a normally-on element.

20. The apparatus of claim 11, wherein the switching element is a normally-off element.

21. A lighting apparatus comprising:
a switching power supply device having a direct-current power supply; and a circuit connected to the direct-current power supply, the circuit including an inductor, a switching element having on and off states, a gate drive circuit for controlling a gate voltage of the switching element to turn the switching element on and off, and an output end connected to an illumination load, wherein the switching element is configured to allow an increasing current to flow from the direct-current power supply to the inductor when the switching element is in the on state and a decreasing current to flow to the inductor when the switching element is in the off state, and wherein the gate drive circuit controls the gate voltage to turn off the switching element when the increasing current reaches a saturated state relative to a source-drain voltage of the switching element.

* * * * *